(12) United States Patent
Chan et al.

(10) Patent No.: US 11,097,741 B1
(45) Date of Patent: Aug. 24, 2021

(54) SYSTEMS AND METHODS FOR REDUCING DISTRACTIONS WITHIN A VEHICLE

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 532 days.

(21) Appl. No.: 15/873,391

(22) Filed: Jan. 17, 2018

Related U.S. Application Data

(60) Provisional application No. 62/448,227, filed on Jan. 19, 2017.

(51) Int. Cl.
*B60W 40/08* (2012.01)
*B60W 50/00* (2006.01)
*G06K 9/00* (2006.01)
*B60K 35/00* (2006.01)

(52) U.S. Cl.
CPC .......... *B60W 40/08* (2013.01); *B60K 35/00* (2013.01); *B60W 50/0098* (2013.01); *G06K 9/00832* (2013.01); *B60K 2370/50* (2019.05); *B60K 2370/739* (2019.05); *B60W 2040/0872* (2013.01); *B60W 2040/0881* (2013.01)

(58) Field of Classification Search
CPC ............ B60W 40/08; B60W 50/0098; B60W 2040/0872; B60W 2040/0881; B60K 35/00; B60K 2370/50; B60K 2370/739; G06K 9/00832
See application file for complete search history.

(56) References Cited

U.S. PATENT DOCUMENTS

| | | | |
|---|---|---|---|
| 9,162,574 B2* | 10/2015 | Kolodziej | H04M 1/72522 |
| 10,049,640 B2* | 8/2018 | Oh | G08G 1/123 |
| 2005/0184860 A1* | 8/2005 | Taruki | H04M 1/6075 340/441 |
| 2007/0061068 A1* | 3/2007 | Okamoto | G08G 1/096716 701/532 |
| 2007/0120697 A1* | 5/2007 | Ayoub | B60R 11/0235 340/686.1 |

(Continued)

*Primary Examiner* — Hussein Elchanti
(74) *Attorney, Agent, or Firm* — Marshall, Gerstein & Borun LLP

(57) ABSTRACT

A computer-implemented method is provided for adjusting at least one of a visual or an auditory setting correlated to the provision of entertainment within a vehicle. The method includes receiving information indicative of one or more changes in behavior that coincides with a provision of entertainment within a vehicle. The information indicative of the one or more changes in behavior is based on data captured by one or more sensors of the vehicle. The method includes analyzing the one or more changes in behavior in order to determine a modification to the provision of entertainment within the vehicle. The modification is commensurate with the one or more changes in behavior. The method includes based on the determined modification, providing, an output signal for adjusting at least one of a visual or an auditory setting correlated to the provision of entertainment within the vehicle.

20 Claims, 5 Drawing Sheets

(56) References Cited

U.S. PATENT DOCUMENTS

| | | | |
|---|---|---|---|
| 2009/0262045 A1* | 10/2009 | Nakano | H04N 21/42607 345/32 |
| 2011/0106365 A1* | 5/2011 | Miyake | B60K 35/00 701/31.4 |
| 2011/0117856 A1* | 5/2011 | Veluppillai | H04W 36/32 455/67.11 |
| 2013/0084847 A1* | 4/2013 | Tibbitts | H04W 4/029 455/419 |
| 2013/0190978 A1* | 7/2013 | Kato | G01C 21/3664 701/36 |
| 2015/0015479 A1* | 1/2015 | Cho | G06F 3/1423 345/156 |
| 2015/0310577 A1* | 10/2015 | Cabasse | B60R 1/00 345/522 |
| 2016/0187992 A1* | 6/2016 | Yamamoto | G06K 9/00389 345/156 |
| 2017/0054949 A1* | 2/2017 | Shaw | G02B 27/0101 |
| 2017/0132922 A1* | 5/2017 | Gupta | G06F 3/0482 |
| 2017/0225690 A1* | 8/2017 | Elnajjar | B60W 50/08 |

* cited by examiner

SYSTEMS AND METHODS FOR REDUCING DISTRACTIONS WITHIN A VEHICLE

CROSS-REFERENCE TO RELATED APPLICATION

This application claims the benefit of U.S. Provisional patent Application No. 62/448,227, entitled "Systems and Methods for Reducing Distractions Within a Vehicle," filed on Jan. 19, 2017, the disclosure of which is hereby incorporated herein by reference.

FIELD

The present disclosure is directed to detecting and analyzing parameters associated with occupant data during the provision of entertainment within a vehicle. More particularly, the present disclosure is directed to systems and methods for providing one or more adjustments to the provision of entertainment within a vehicle.

BACKGROUND

The behavior of one or more passengers within a vehicle may be distracting to a driver of the vehicle. In some instances, the driver may not be able to divert attention from driving in order to respond to the behavior. Moreover, distractions to a driver may increase the risk to the one or more passengers and the driver.

SUMMARY

In one aspect, a computer-implemented method for adjusting at least one of a visual or an auditory setting correlated to the provision of entertainment within a vehicle is disclosed. A computer-implemented method may include receiving, at a computing system including one or more processors, information indicative of one or more changes in behavioral performance that coincides with a provision of entertainment within a vehicle. The information indicative of the one or more changes in behavioral performance is based on data captured by one or more sensors of the vehicle. The method may also include analyzing, by the one or more processors, the one or more changes in behavioral performance in order to determine a modification to the provision of entertainment within the vehicle. The modification is commensurate with the one or more changes in behavioral performance. The method may also include, based on the determined modification, providing, by the computing system, an output signal for adjusting at least one of a visual or an auditory setting correlated to the provision of entertainment within the vehicle.

In another aspect, a system for adjusting at least one of a visual or an auditory setting correlated to the provision of entertainment within a vehicle is disclosed. The system includes one or more computing devices. The system also includes a non-transitory computer-readable memory coupled to the one or more computing devices and storing thereon instructions, that when executed by the one or more computing devices, cause the one or more computing devices to receive information indicative of one or more changes in behavioral performance that coincides with a provision of entertainment within a vehicle. The information indicative of the one or more changes in behavioral performance is based on data captured by one or more sensors of the vehicle. The instructions also cause the one or more computing devices to analyze the one or more changes in behavioral performance in order to determine a modification to the provision of entertainment within the vehicle. The modification is commensurate with the one or more changes in behavioral performance. The instructions also cause the one or more computing devices to, based on the determined modification, provide an output signal for adjustment of at least one of a visual or an auditory setting correlated to the provision of entertainment within the vehicle.

DETAILED DESCRIPTION

Figure 1:
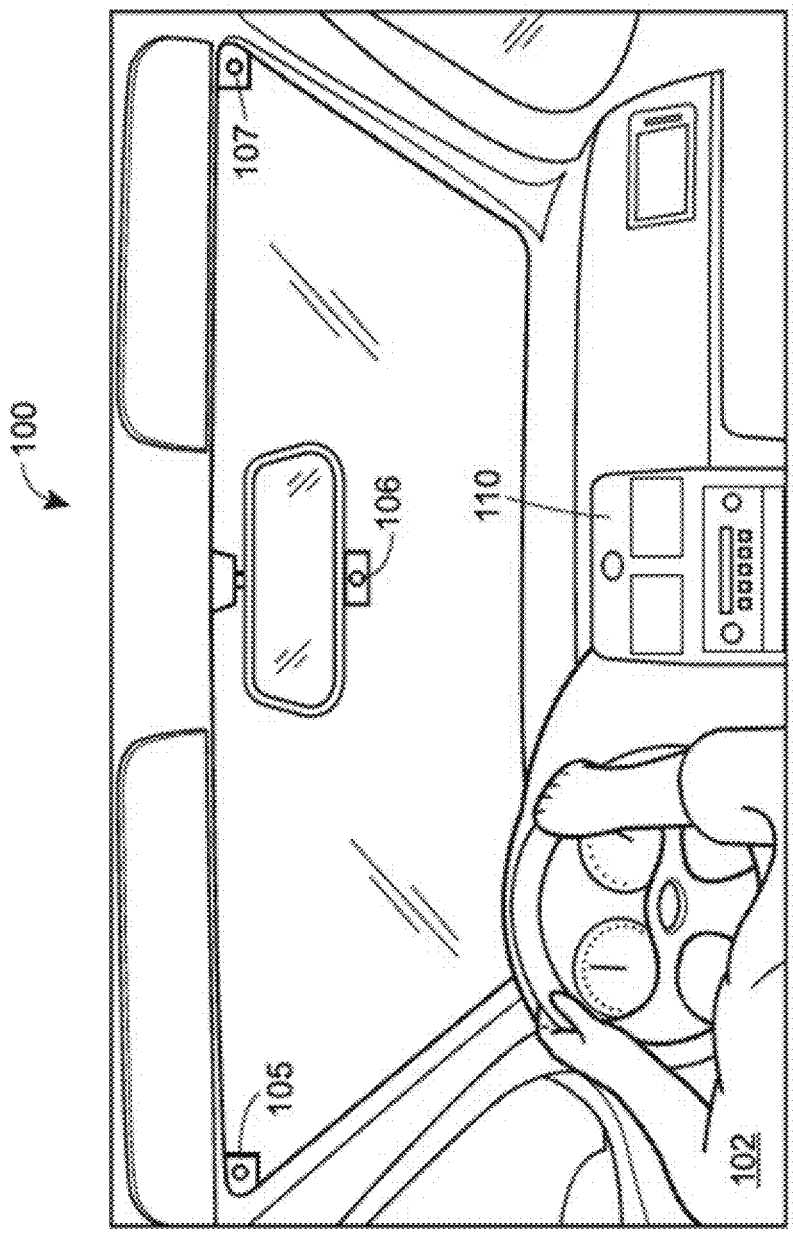
FIG. 1 depicts an exemplary environment within a vehicle, including various components configured to facilitate various functionalities, in accordance with some embodiments.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

The present embodiments may relate to, inter alia, detecting, comparing, and analyzing occupant data that coincides with the provision of entertainment within a vehicle. In some scenarios, a passenger (e.g., a child) may be provided with a form of entertainment (e.g., a movie, a mobile application, etc.) that helps to minimize distractions associated with a change in behavioral performance that an individual (e.g., a parent) may experience while operating the vehicle. Typically, when a child exhibits a change in behavioral performance (e.g., yelling, crying, fighting, etc.) during operation of the vehicle, the individual operating the vehicle will be distracted and required to respond to the change in behavioral performance. In some instances, the distraction could lead to a collision or induce aggressive behavior from the vehicle operator. Presently, there is no way to properly provide real-time or near real-time feedback to a passenger based on a change in behavioral performance that distracts an individual operating a vehicle. The present embodiments improve these shortcomings by analyzing occupant data and adjusting one or more settings associated with the provision of entertainment within a vehicle in real-time or near-real time in order to reduce distractions through negative reinforcement.

In one embodiment, a system may be configured to receive information pertaining to one or more changes in behavioral performance associated with the passenger during the provision of entertainment. For example, the system may include sensors (e.g., image sensors, audio sensors, etc.) that are configured to capture occupant data and provide it to the system for analysis. In one example, a camera coupled to the vehicle may capture movement data that is indicative of a passenger hitting a second passenger (e.g., children fighting). In another example, a microphone within an electronic device (e.g., a smartphone, a tablet, etc.) may capture audio data that is indicative of a child screaming. In yet another example, an image sensor and/or an audio sensor may detect an attempt to tamper with the system itself. The system may, for example, detect tampering based upon a detected throwing motion from a passenger (indicating an object thrown at a sensor), a detected impact of an object with a sensor, or an attempted blockage of a sensor. In any case, the movement data or audio data may be provided to the system for analysis and subsequent modification to the provision of entertainment.

The system may be configured to analyze the received information that is indicative of one or more changes in behavioral performance. Based on the analysis, the system may be configured to determine a modification to the provision of entertainment within the vehicle that is commensurate with the one or more changes in behavioral performance. In one example, according to the analysis, the system may determine that a particular movement between two passengers corresponds to fighting and may distract the driver depending on further changes in behavior such as yelling or crying that may follow the fighting. In this example, the driver may not have had a chance to see what was happening in the backseat and further unable to deter the fighting through negative reinforcement without diverting attention from driving. However, the system could be configured to detect the one or more changes in behavioral performance (e.g., children fighting) and determine a modification to the provision of entertainment in real-time or near real-time.

Based on the determined modification, the system may provide an output signal that includes an adjustment to at least one of a visual or auditory setting correlated to the provision of entertainment. For example, the system may determine a modification that includes dimming the level of brightness of a display associated with the entertainment based on a child yelling within the vehicle. In this example, the system may maintain the dimmed level of brightness of the display until the system determines that the child has stopped yelling. Upon determining that the child has stopped yelling, the system may reverse dimming the level of brightness in order for the child to understand the consequences associated with one or more changes in behavioral performance. In another example, the system may determine a modification that includes reducing the volume level associated with entertainment according to an analysis of one or more changes in behavioral performance that may lead to distractions within a vehicle. In this example, the system may reduce the volume level for a period of time until the passenger exhibits a desired change in behavioral performance.

FIG. 1 illustrates an example depiction of an interior of a vehicle 100 that may include various components associated with the systems and methods. In some scenarios, an individual 102 may operate (i.e., drive) the vehicle 100. As depicted in FIG. 1, the interior of the vehicle 100 may support a set of image sensors 105, 106, and 107. In the particular scenario depicted in FIG. 1, each of the image sensors 105 and 107 is located near a top corner of the interior of the vehicle 100, and the image sensor 106 is located below a rear view mirror. Although three (3) image sensors are depicted in FIG. 1, it should be appreciated that additional or fewer image sensors are envisioned. Further, it should be appreciated that the image sensors 105, 106, and 107 may be disposed or located at various alternate or additional portions of the vehicle 100, including on an exterior of the vehicle 100.

Each of the image sensors 105, 106, and 107 may be configured to detect and convey information that constitutes an image. In particular, each of the image sensors 105, 106, and 107 may generate digital image data according to the detected information, where the digital image data may be in the form of two-dimensional (2-D) and/or three-dimensional (3-D) image data and/or video data. Although not depicted in FIG. 1, the vehicle 100 may also include one or more audio sensors (e.g., microphones) that may be disposed in one or more locations, where the audio sensors may be configured to capture audio data that may supplement the digital image data captured by the image sensors 105, 106, and 107. It should also be appreciated that image data and/or audio data may also be captured by sensors integrated in an electronic device (e.g., a smartphone, a tablet, a laptop, etc.).

The vehicle 100 may include a system 110 configured with any combination of software and hardware components. In some implementations, the system 110 may be included as part of an on-board diagnostic (OBD) system or any other type of system configured to be installed in the vehicle 100, such as an original equipment manufacturer (OEM) system. The system 110 may include a set of sensors configured to detect and record various telematics data associated with the vehicle 100. In some implementations, the system 110 may be configured to communicate with (i.e., request, retrieve, or receive data from) a set of sensors disposed in other locations of the vehicle 100, such as each of the image sensors 105, 106, and 107, or audio sensors (not shown in FIG. 1), or sensors integrated in an electronic device (not shown in FIG. 1).

According to embodiments, the set of sensors included in the system 110 or otherwise configured to communicate with the system 110 may be of various types. For example, the set of sensors may include a location module (e.g., a global positioning system (GPS) chip), an accelerometer, an ignition sensor, a clock, speedometer, a torque sensor, a throttle position sensor, a compass, a yaw rate sensor, a tilt sensor, a steering angle sensor, a brake sensor, and/or other sensors. The set of sensors may also be configured to detect various conditions of the passengers within vehicle 100, including various biometric information, movements, and/or the like.

The system 110 may be configured to receive information indicative of one or more changes in behavioral performance (e.g., based on data captured by image sensors 105, 106, 107) that coincides with the provision of entertainment within vehicle 100. The system 110 may include one or more processors (not shown in FIG. 1) that may be configured to analyze information indicative of one or more changes in behavioral performance. According to the analysis, the system 110 may determine a modification to the provision of entertainment that is commensurate with the one or more changes in behavioral performance. Based on the modification, the system 110 may provide an output signal that includes an adjustment to one of a visual or an auditory setting correlated to the provision of entertainment within vehicle 100.

Figure 2:
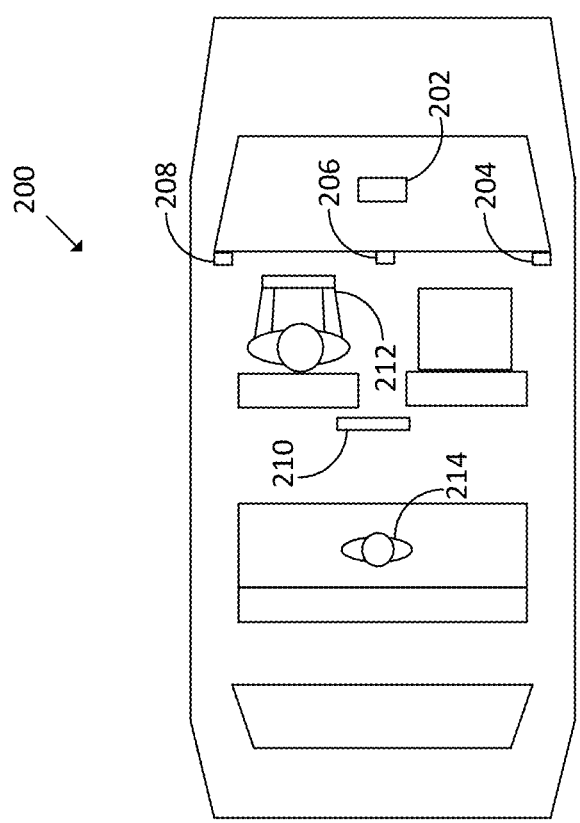
FIG. 2 depicts an example top view of a vehicle, in accordance with some embodiments.

FIG. 2 illustrates an example depiction of a top view of vehicle 200 that may include various components associated with the systems and methods. The vehicle 200 includes system 202 and a set of image sensors 204, 206, and 208 (that operate in a similar manner as discussed with the image sensors 105, 106, and 107 of FIG. 1). The vehicle 200 also includes entertainment system 210 that is configured to provide a video signal or audio signal or both. FIG. 2 also depicts individual 212 operating the vehicle 200 and individual 214 using the entertainment system 210.

In some embodiments, the system 202 may include one or more computing devices (not shown in FIG. 2) and a non-transitory computer-readable memory (not shown in FIG. 2) coupled to the one or more computing devices. The non-transitory computer-readable memory may be configured to store instructions that, when executed by the one or more computing devices, cause the one or more computing devices to receive information indicative of one or more changes in behavioral performance that coincides with a provision of entertainment within vehicle 200, through the use of the entertainment system 210. The information indicative of the change in behavioral performance is based on data captured by one or more sensors (e.g., image sensors 204, 206, and 208) of the vehicle 200.

In one embodiment, the set of image sensors 204, 206, and 208 may capture 2-D and/or 3-D image data of the individual 214. The image sensors 204, 206, and 208 may provide the captured image data to the system 202 in a real-time basis and/or a near real-time basis. In some embodiments, the system 202 may be configured to activate the image sensors 204, 206, and 208 according to whether the entertainment system 210 is in use. In another embodiment, an audio sensor (not shown in FIG. 2) coupled to the vehicle 200 may be configured to detect a change in behavioral performance by detecting an auditory event (e.g., yelling) associated with individual 214. The audio sensor may provide the captured data (e.g., a sound frequency, amplitude, frequency of occurrence, or duration of time of the auditory event) to the system 202 also in a real-time basis and/or a near real-time basis. Based on an analysis of the information indicative of the change in behavioral performance associated with individual 214, the system 202 may determine a modification to the provision of entertainment that is commensurate with the change in behavioral performance. Further, the system 202 may be configured to analyze subsequent data captured by the audio sensor in order to determine whether individual 214 has exhibited a change in behavioral performance (e.g., ceased yelling). Based on a determination that the individual 214 is no longer causing a distraction (e.g., ceased yelling) to individual 212, the system 202 may be configured to reverse the modification to the provision of entertainment.

In some embodiments, the entertainment system 210 may be configured to provide entertainment (e.g., television shows, movies, etc.) to individual 214 during operation of vehicle 200 by individual 212. The entertainment system 210 may be configured to allow for the adjustment of one or more settings associated with a video signal and/or audio signal. In some embodiments, the entertainment system 210 may be coupled to the system 202 and configured to receive one or more adjustments to the video signal and/or audio signal. In some embodiments, the entertainment system 210 may extend to one or more electronic devices (e.g., smartphones, tablets, etc.). The entertainment system 210 may also be configured to provide access to content stored remotely from the vehicle 200. Access to the content stored remotely may be made accessible via one or more networks such as a cellular network, a Wi-Fi network, a WiMAX network, a wide area network (WAN), and a local area network, etc. In some embodiments, the entertainment system 210 may be coupled to one or more speakers (not shown in FIG. 2) of vehicle 200. In other embodiments, the entertainment system 210 may include one or more inputs (e.g., headphone connector, etc.) and/or be configured to provide a wireless signal (e.g., Wi-Fi, Bluetooth, etc.) to one or more devices (e.g., wireless headphones, smartphones, etc.). An example implementation of the system 202 will be described in an example scenario based on individual 212 operating vehicle 200 and individual 214 using the entertainment system 210 with reference to FIG. 2.

In this example scenario, individual 212 may be focused on driving while individual 214 is watching a movie via a display (not shown in FIG. 2) coupled to the entertainment system 210. After a given period of time, the individual 214 may request an item (e.g., a bottle) that individual 212 is unable to provide to individual 214 due to operation of vehicle 200. In this example scenario, individual 212 may exhibit a change in behavioral performance (e.g., begin to yell) as a result of not receiving the requested item and thereby distract individual 214 from operating vehicle 200.

In one example, one or more audio sensors (not shown in FIG. 2) may detect a sudden change in the volume within vehicle 200 due to individual 214 beginning to yell as a result of not receiving the item. In some embodiments, one or more computing devices of the system 202 may receive the captured data and perform an analysis on the capture data according to a set of rules. The set of rules may include one or more instructions for determining a modification to the provision of entertainment according to one or more characteristics of the captured audio data. For example, based on an analysis of the frequency and intensity associated with the captured audio data (and/or other characteristics of a detected auditory event), the set of rules may specify how to modify one or more aspects (e.g., brightness, volume, etc.) of the provision of entertainment. In one example, the set of rules may specify a decrease in the level of brightness associated with the display of the entertainment system 210 and a decrease in the level of volume associated with one or more speakers of vehicle 200 based on the severity of the change in behavioral performance.

Based on the determined modification, the system 202 may provide an output signal to the entertainment system 210. In some embodiments, the output signal may include an adjustment to at least one of a visual or an auditory setting correlated to the provision of entertainment within vehicle 200. For example, the system 202 may provide an output signal to the entertainment system 210 that includes one or more instructions for stopping the provision of the video signal. In some examples, the output signal may include an image (e.g., a "blue screen") for display that serves to inform individual 214 why the video signal has been stopped. The system 202 may continue receiving real-time information indicative of one or more changes in the behavioral performance associated with individual 214 before restoring the provision of the video signal.

In some embodiments, the one or more computing devices may use the set of rules and a library of movement data to analyze the 2-D and/or 3-D image data captured by the set of image sensors 204, 206, and 208 in order to determine a modification. In one implementation, the system 202 may retrieve the library of movement data from a remote server (not shown) via one or more networks. In another implementation, the system 202 may retrieve the library of movement data locally stored on the memory of the system 202. In some embodiments, the library of movement data may also include modifications to the provision of entertainment that are commensurate with the one or more changes in behavioral performance based on given movements.

The one or more computing devices may compare the captured 2-D and/or 3-D image data with the library of movement data to identify the occupant movements or behaviors. In particular, the system 202 may analyze differences and similarities of characteristics of the captured 2-D and/or 3-D image data with the library of movement data to match the captured data to a given movement of the library of movement data. Further, the system 202 may use the match to determine a modification to the provision of entertainment. For example, if the system 202 determines that the individual 214 threw an object within the vehicle 200, the system 202 may determine a modification with a higher degree of negative reinforcement than if the system 202 determined that the individual 214 is moving their head while yelling. In another example, if the system 202 determines that the individual 214 has stopped yelling, the system 202 may determine a modification that restores the provision of entertainment.

The analysis may include calculating one or more scores associated with the one or more changes in behavioral performance. For example, the system 202 may assign a higher score to a change in behavioral performance that corresponds to one child hitting another child. The system 202 may also maintain a log that tracks the one or more changes in behavioral performance in order to refer back to the log and adjust subsequent modifications. For example, the system 202 may increase the duration of time associated with a subsequent modification in order to discourage the individual 214 from continuing to behave in a manner that is distracting to the individual 212. The scores associated with the changes in behavioral performance may be aggregated and/or combined in any suitable manner, such as by adding the scores, multiplying the scores, averaging the scores, assigning a weight to each score and adding or multiplying the weighted scores, taking a weighted average of the scores, etc. In any event, the scores may be combined/aggregated to determine a modification to the provision of entertainment.

Figure 3:
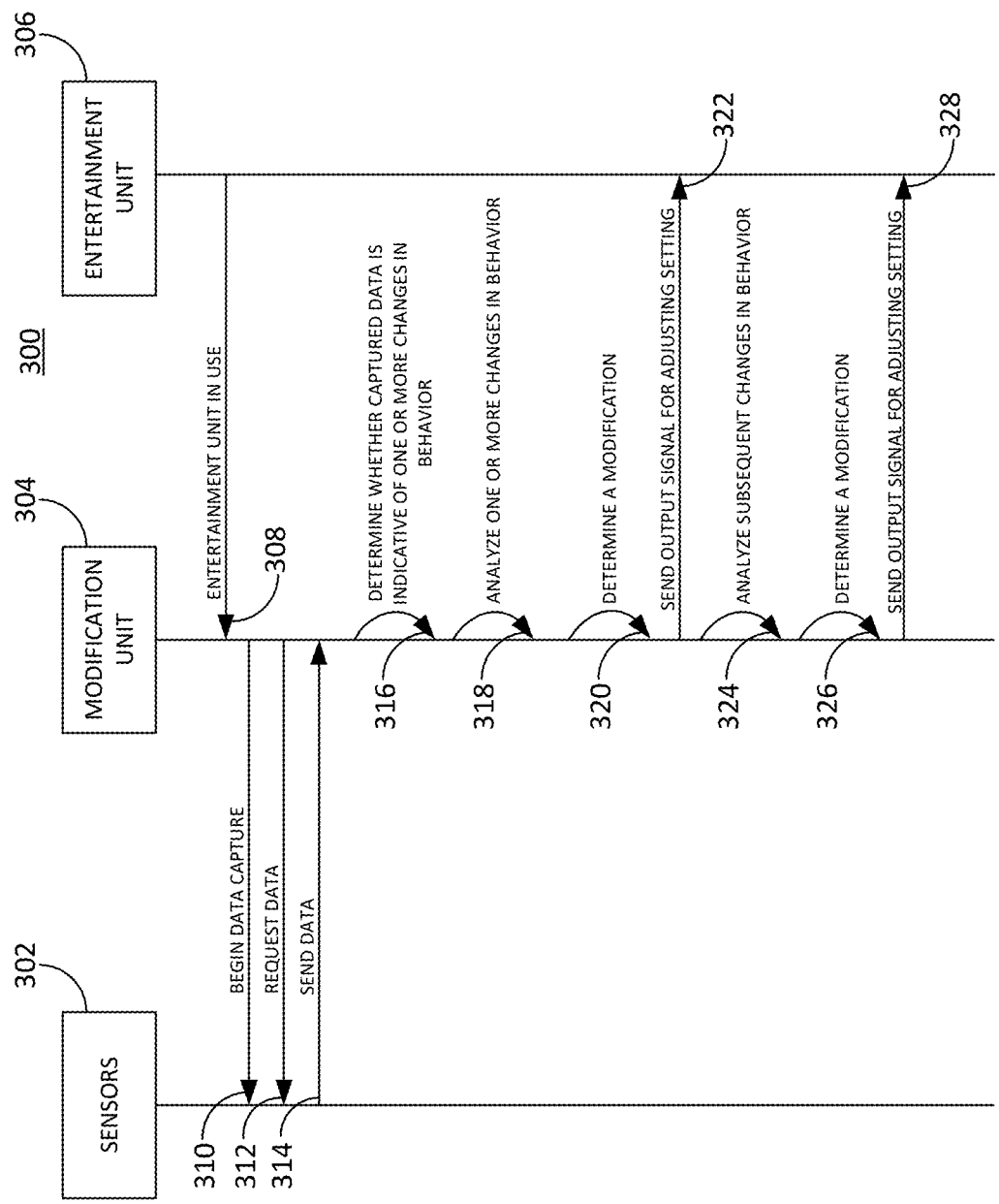
FIG. 3 depicts an exemplary signal diagram associated with reducing distractions within a vehicle, in accordance with some embodiments.

FIG. 3 depicts a signal diagram 300 associated with facilitating certain functionalities associated with the systems and methods. The signal diagram 300 includes a set of components that may be associated with a vehicle: a set of sensors 302 (such as one or more of the image sensors 104, 106, and 108 as discussed with respect to FIG. 1), a modification unit 304 (such as system 110 as discussed with respect to FIG. 1, system 202 as discussed with respect to FIG. 2), and an entertainment unit 306 (such as entertainment system 210 as discussed with respect to FIG. 2). According to embodiments, the set of sensors 302 may be a component of (or separate from) of an electronic device (e.g., a tablet, a smartphone, etc.). Further, according to embodiments, the set of sensors 302 may include sensors capable of capturing occupant data including physiological data regarding the occupant such as, for example, an arm movement, a head movement, a vocal amplitude, a vocal frequency, a vocal pattern, a gaze direction, a gaze duration, a head direction, and an eyelid opening.

The signal diagram 300 may begin when the modification unit 304 receives a signal (308) from entertainment unit 306 that the entertainment unit 306 is in use. According to embodiments, the modification unit 304 may activate (310) the use of the set of sensors 302 and request (312) data captured by the set of sensors 302. The set of sensors 302 may send (314) the data captured to modification unit 304. In one implementation, the set of sensors 302 may send the data captured to the modification unit 304 in real-time or near real-time as the set of sensors 302 captures the data, and/or in response to a request from the modification unit 304. In another implementation, the set of sensors 302 may send previously-captured data to the modification unit 304, such as if the set of sensors 302 interfaces with some type of memory or storage. It should be appreciated that the captured data may be indicative of one or more changes in behavioral performance of a passenger of the vehicle.

The modification unit 304 may be configured to determine (316) whether the captured data is indicative of one or more changes in behavioral performance in response to a trigger event. For example, the modification unit 302 may analyze captured image data using one or more software algorithms to identify possible movements that could be indicative of fighting between one or more passengers, or indicative of attempted tampering with a sensor 302 (e.g., attempted destruction or blockage of a sensor 302). For instance, the modification unit 302 may analyze differences and similarities of characteristics indicated in the identified movements with movements included in a library of movements, where the characteristics may include movement(s) of specific body parts (e.g., right arm), direction(s) of movement(s), and distance(s) of movement(s). In some implementations, the library of movements may include eye-tracking movements, head-tracking movements, gesture-tracking movements, occupant posture, and/or other visual data that indicates occupant movements or behaviors. In one implementation, the modification unit 304 may access the library of movements from local memory or from remote storage via a network connection.

In another example, the modification unit 304 may analyze captured audio data using one or more techniques to identify an audio event (e.g., indicative of a passenger yelling). For instance, the modification unit 304 may detect an increase in decibel levels associated with a given region of the vehicle, a frequency of the increase in decibel levels, and/or a duration of the increase in decibel levels, and thereby determine that the increase is based on one or more changes in behavioral performance. It should be appreciated that other types of calculations, algorithms, comparisons, or techniques are envisioned.

The modification unit 304 may analyze (318) the one or more changes in behavioral performance. In particular, the modification unit 304 may assign a score to the one or more changes in behavioral performance according to a set of rules. For example, a score of 50 may be assigned to a given change in behavioral performance based on a determination that a passenger threw an object (e.g., a toy) within the vehicle. The modification unit 304 may also assign a score of 25 to a given change in behavioral performance based on a determined increase in decibel levels that may correspond to the passenger yelling. The modification unit 304 may combine both scores in order to determine a modification to the provision of entertainment based on a score of 75.

The modification unit 304 may determine (320) a modification to the provision of entertainment that is commensurate with the one or more changes in behavioral performance. For example, the modification unit 304 may access stored modification data that includes one or more adjustments to visual and/or auditory settings correlated to the provision of entertainment based on one or more thresholds. In one example, based on a score of 75, the stored modification data may include an adjustment with a 75 percent reduction in level of brightness associated with a video signal. In another example, based on a score of 100, the stored modification data may include an adjustment that stops the provision of the video signal and further displays one or more images (e.g., a "blue screen" disrupting normal display of video entertainment). The one or more images may serve as an additional form of reinforcement that the change in behavioral performance is undesirable.

According to the determined modification, the modification unit 304 may send (322) an output signal for adjusting at least one of a visual or an auditory setting correlated to the provision of entertainment within the vehicle. For instance, the entertainment unit 306 may be configured to receive the signal and reduce the level of brightness by 75 percent in real-time or near real-time.

The modification unit 304 may continue analyzing (324) captured data subsequent to the adjustment of the visual and/or auditory settings in order to determine a change in behavioral performance (e.g., a child behaving). In one example, the modification unit 304 may determine a decrease in decibel levels associated with the given region of the vehicle that was previously associated with the passenger yelling. In this example, the modification unit 304 may determine (326) a modification to the provision of entertainment based on a change in behavioral performance that reduces distractions within the vehicle. In some embodiments, according to the set of rules, the modification unit 304 may be configured to analyze the captured data over a duration of time before determining that the change in behavioral performance has occurred.

Based on the determined modification, the modification unit 304 may send (328) an output signal for adjusting the one or more visual or auditory settings according to the previous adjustment (322). For example, based on a previous modification that reduced the level of brightness by 75 percent, the modification unit 304 would send an output signal that includes instructions for increasing the level of brightness by 75 percent.

The modification unit 304 may also optionally retrieve certain operation parameters from one or more computing units associated with the vehicle. The operation parameters may be certain thresholds or other metrics that the modification unit 304 may use to determine the modification to the provision of entertainment. For example, the modification unit 304 may receive information that the headlights of the vehicle are in use during the provision of entertainment. In this example, a modification that reduces the level of brightness by 75 percent may not be the best modification due to a low amount of ambient light within the vehicle (e.g., the vehicle is driving at night). Instead, the modification unit 304 may provide a modification that stops the provision of entertainment.

In some implementations, the modification unit 304 may record the information indicative of one or more changes in behavioral performance in the form of a log. In some implementations, the modification unit 304 may refer to the log in order to determine an appropriate modification to the provision of entertainment. In one example, the modification unit 304 may determine an increased duration of time associated with the modification based on one or more changes in behavioral performance having occurred within a given period of time (e.g., within the last thirty minutes), for example by examining or accessing time stamp data included in the log. It should be appreciated that the set of rules may include other thresholds that correspond to various aspects of one or more modifications. In particular, certain changes in behavior may correlate with stronger modifications to the provision of entertainment.

Figure 4:
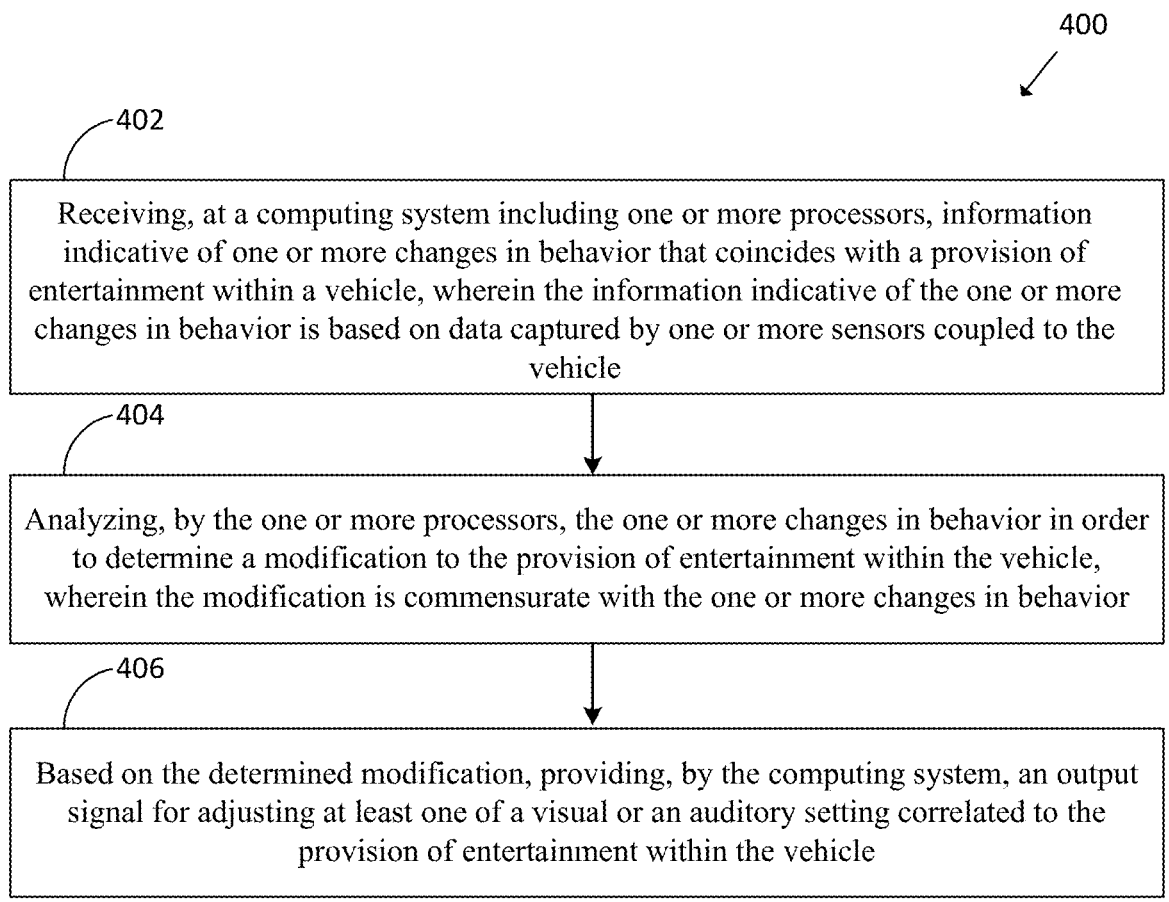
FIG. 4 depicts an exemplary flow diagram associated with reducing distractions within a vehicle, in accordance with some embodiments.

FIG. 4 is a flow diagram of an example method for adjusting at least one of a visual or an auditory setting correlated to the provision of entertainment within a vehicle, in accordance with at least some of the embodiments described herein. Although the blocks in FIG. 4 are illustrated in a sequential order, the blocks may in some instance be performed in parallel, and/or in a different order than those described therein. Also, the various blocks may be combined into fewer blocks, divided into additional blocks, and/or removed based upon the desired implementation.

In addition, the flow diagram of FIG. 4 shows the functionality and operation of one implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 4 may represent circuitry that is wired to perform the specific logical functions in the process. Illustrative methods, such as those shown in FIG. 4, may be carried out in whole or in part by a component or components in the cloud and/or system. However, it should be understood that the example method may instead be carried out by other entities or combinations of entities (i.e., by other computing devices and/or combinations of computing devices), without departing from the scope of the invention. For example, functions of the method of FIG. 4 may be fully performed by a computing device (or components of a computing device such as one or more processors), or may be distributed across multiple components of the computing device, across multiple computing devices, and/or across a server.

Referring to FIG. 4, the example method 400 may include one or more operations, functions, or actions as illustrated by blocks 402-406. In one embodiment, the method 400 is implemented in whole or in part by the system 110 of FIG. 1 (or one or more processors thereof), the system 202 of FIG. 2 (or one or more processors thereof), or the modification unit 304 of FIG. 3.

The method 400 includes receiving, at a computing system including one or more processors, information indicative of one or more changes in behavior that coincides with a provision of entertainment within a vehicle, wherein the information indicative of the one or more changes in behavior is based on data captured by one or more sensors of the vehicle (block 402). In some embodiments, the information indicative of the one or more changes in behavior may include audio data or image data or both. In one example, the one or more sensors of the vehicle may include audio sensors (e.g., microphones) that are positioned in various locations throughout the vehicle. In another example, the one or more sensors may include an image sensor and an audio sensor that are part of a mobile electronic device (e.g., smartphone, tablet, etc.). The computing system may be configured to receive the information indicative of the one or more changes in behavior in real-time or near real-time.

The method 400 also includes analyzing, by the one or more processors, the one or more changes in behavior in order to determine a modification to the provision of entertainment within the vehicle, wherein the modification is commensurate with the one or more changes in behavior (block 404). In one example, the information indicative of the one or more changes in behavior may include image data captured by one or more image sensors. In this example, the analysis of the image data may also include a comparison of the captured image data to stored image data that corresponds to predetermined movements. Further, based on a match of the captured image data to the stored image data, the computing system may determine a modification to the provision of entertainment within the vehicle. For instance, the computing system may determine that the captured image data corresponds to a child reaching over and interfering with another child. In this instance, the computing system may determine a modification that is commensurate with a behavior that corresponds to distractions associated with multiple passengers. In another instance, the computing system may determine that captured image data and/or audio data corresponds with an attempt by a passenger to tamper with (e.g., destroy or block) an image sensor or an audio sensor.

In some embodiments, the analysis of one or more changes in behavior may also include an analysis of one or more operational parameters associated with the vehicle in order to determine the modification to the provision of entertainment. For example, the computing system may receive information indicative of a low travelling speed (e.g., vehicle travelling in traffic). In this example, the sound of the audio signal may be more pronounced as a result of the low travelling speed. Depending on a change in behavior, the system may determine a modification that reduces the volume associated with an audio signal in order to deter the passenger from a certain behavior and based on the absence of noise due to the low travelling speed.

In another example, the information indicative of the one or more changes in behavior may include audio data captured by one or more audio sensors. For instance, the one or more audio sensors may be configured to capture data at a different sampling rate depending on an audio event detection (e.g., the volume of sound exceeds a threshold, a frequency of the sound, and/or a duration of the sound). In this example, the analysis may include detecting an increase or decrease in decibel levels associated with one or more occupants in the vehicle. Further, based on the increase or decrease in decibel levels (and/or other characteristics of the detected audio event), the computing system may determine the modification to the provision of entertainment within the vehicle.

The method 400 may also include based on the determined modification, providing, by the computing system, an output signal for adjusting at least one of a visual or an auditory setting correlated to the provision of entertainment within the vehicle (block 406). In another example, when the provision of entertainment includes a video signal (e.g., a movie), the method 400 may include providing an output signal that stops the provision of the video signal until further detection of a given change in behavior. The output signal may include an image, such as a "blue screen," for display subsequent to stopping the video signal. The image may be selected from a group of images that are intended to inform the individual that the change in behavior is not acceptable. For instance, an image with the word "No" may be displayed according to the analysis of the change in behavior.

In another example, when the provision of entertainment includes a video signal, the method 400 may include adjusting the level of brightness associated with the video signal. For instance, if a first change in behavior is associated with an increase in distractions within the vehicle, then the adjustment may include a decrease in the level of brightness. In this example, if a second change in behavior is associated with a decrease in distractions within the vehicle, then the adjustment may include an increase in the level of brightness that restores one or more settings of the video prior to the first change in behavior. In a similar manner as described with the video signal, when the provision of entertainment includes an audio signal, the method 400 may include adjusting the volume of the audio signal by increasing or decreasing the volume according to the determined change in behavior.

The method 400 may also include determining the duration of time associated with the modification to the provision of entertainment. For example, the method may refer to previous detected changes in behavior (e.g., by accessing a behavior log) and based on one or more previous changes in behavior, increase the duration of subsequent modifications in an attempt to deter a continuation of behavior that increases the distractions within the vehicle. It should be appreciated that changes to other aspects of the modification are envisioned.

In another example, the method 400 may include providing an output signal for locking or unlocking an electronic device according to the determined modification. In some embodiments, the passenger of the vehicle may use an electronic device (e.g., smartphone, tablet, etc.) that provides entertainment within the vehicle. A system configured to implement the method 400, may receive image and/or audio data from the electronic device in order to analyze one or more changes in behavior. In one scenario, based on a determined change in behavior, the method 400 may include providing an output signal that locks the electronic device in order to prevent the passenger from continuing to use the electronic device (e.g., playing a mobile game). Further, based on a determined change in behavior that reduces distractions within the vehicle, the method 400 may include providing an output signal that unlocks the electronic device.

Figure 5:
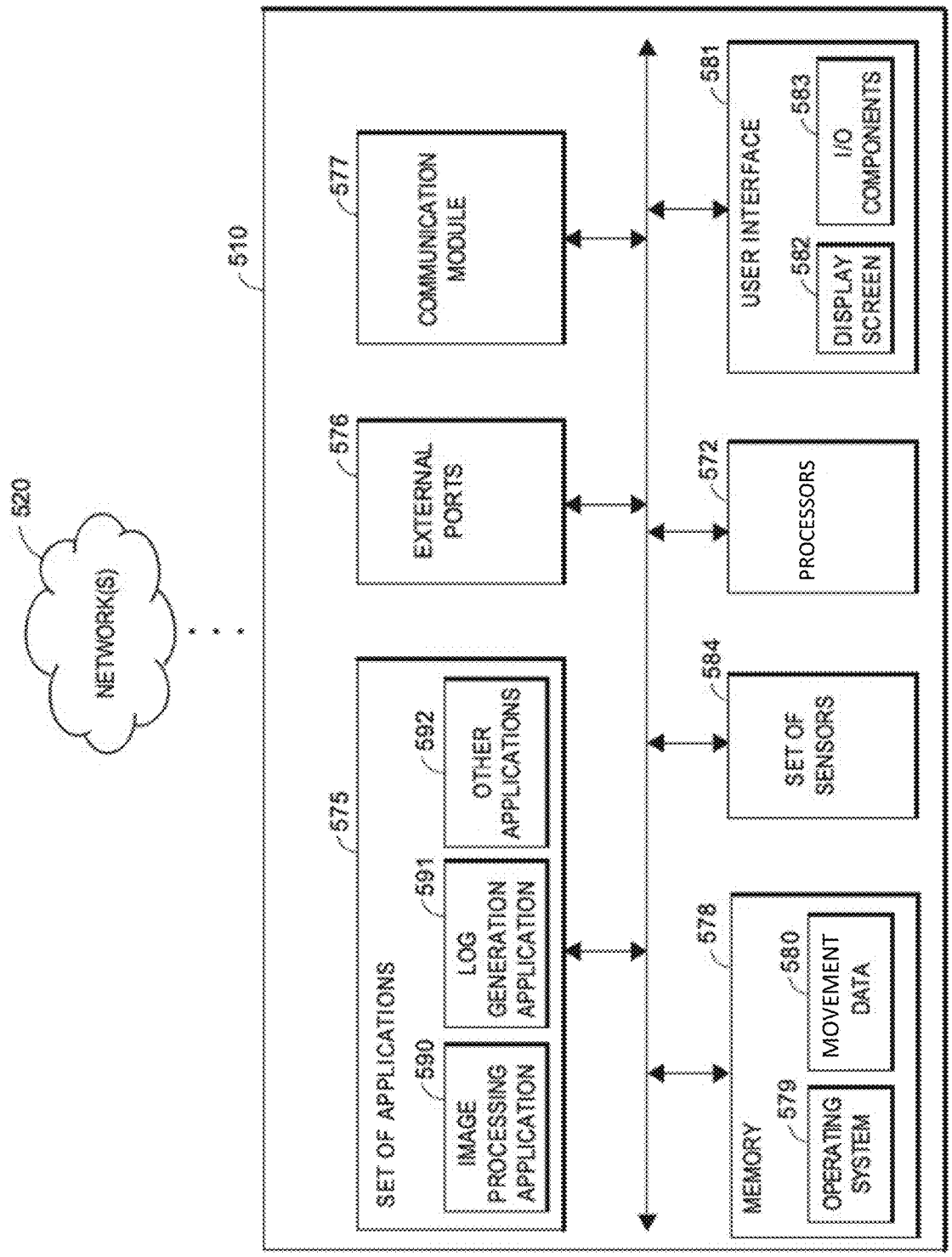
FIG. 5 is a block diagram of an exemplary system for reducing distractions within a vehicle, in accordance with some embodiments.

FIG. 5 illustrates a diagram of an exemplary system 510 (such as the system 110 of FIG. 1, the system 202 of FIG. 2, the modification unit 304 of FIG. 3) in which the functionalities as discussed herein may be implemented. It should be appreciated that the system 510 may be configured to be transported in a vehicle and/or connect to an on-board telematics platform of the vehicle, as discussed herein. Further, it should be appreciated that the system 510 may be integrated into an on-board system of the vehicle.

The system 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data to identify one or more changes in behavioral performance, and a log generation application 591 configured to interface with sensors and generate behavior logs that may include occupant data. It should be appreciated that one or more other applications 592 are envisioned, such as an application configured to interface wirelessly with one or more electronic devices (e.g., smartphone, tablet, etc.).

The processor 572 may interface with the memory 578 to execute the operating system 579 and the set of applications 575. According to some embodiments, the memory 578 may also include a library of movement data 580. In some implementations, the image processing application 590 may interface with the movement data 580 to retrieve movement data and analyze the captured 2-D and/or 3-D image data with the movement data. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The system 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, a library of movement data from a remote server. For further example, the communication module 577 may transmit data to and receive data from a remote server via the network 520.

The system 510 may further include a set of sensors 584 (e.g., image sensors 105, 106, and 107 of FIG. 1, image sensors 204, 206, and 208 of FIG. 2, and/or the set of sensors 302 of FIG. 3). The processor 572 and the set of applications 575 may interface with the set of sensors 584 to retrieve and process the corresponding sensor data. The set of sensors 584 may include, for example, one or more image sensors, audio sensors, various biometric sensors capable of sensing various biometric data as discussed herein, and/or the like. In one particular implementation, the log generation application 591 may use various data from the set of sensors 584 to generate occupant behavior logs.

The system 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the system 510 via the user interface 581 to review information and/or perform other functions. In some embodiments, the system 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor(s) 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, ActionScript, Objective-C, JavaScript, CSS, XML). In some embodiments, the computer program product may be part of a cloud network of resources.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement in computer functionality, and improve the functioning of conventional computers.

What is claimed is:

1. A computer-implemented method, comprising:
receiving, at a computing system including one or more processors, information indicative of one or more changes in behavioral performance that coincides with a provision of entertainment within a vehicle, wherein the information indicative of the one or more changes in behavioral performance is based on data captured by one or more sensors of the vehicle;
analyzing, by the one or more processors, the one or more changes in behavioral performance in order to determine (i) a severity of the one or more changes in behavioral performance, and (ii) a variable degree of modification to the provision of entertainment within the vehicle, wherein the degree of modification is commensurate with the severity of the one or more changes in behavioral performance; and
based on the determined modification, providing, by the computing system, an output signal indicating the determined degree of modification for adjusting at least one of a visual or an auditory setting correlated to the provision of entertainment the vehicle.

2. The method of claim 1, wherein the provision of entertainment includes a video signal, wherein providing the output signal further includes:
providing, by the computing system, an image for display subsequent to stopping the provision of the video signal at least until further detection of a given change in behavioral performance.

3. The method of claim 1, wherein the provision of entertainment includes a video signal, wherein adjusting the visual setting includes an increase or decrease in level of brightness associated with the video signal.

4. The method of claim 1, wherein the provision of entertainment includes an audio signal, wherein adjusting the auditory setting includes an increase or decrease in level of volume associated with the audio signal.

5. The method of claim 1, wherein the information indicative of the one or more changes in behavioral performance includes image data captured by one or more image sensors, wherein analyzing the one or more changes in behavioral performance includes:
comparing, by the computing system, the captured image data to stored image data of predetermined movements; and
based on a match of the captured image data to the stored image data, determining, by the computing system, the degree of modification to the provision of entertainment within the vehicle.

6. The method of claim 1, wherein the information indicative of the one or more changes in behavioral performance includes audio data captured by one or more audio sensors, wherein analyzing the one or more changes in behavioral performance includes:
detecting, by the computing system, an auditory event indicated by at least one of (i) an increase or decrease in decibel levels associated with one or more occupants in the vehicle, (ii) a frequency of occurrence of the increase or decrease in decibel levels, or (iii) a duration of the increase or decrease in decibel levels; and
based on the detected auditory event, determining, by the computing system, the modification to the provision of entertainment within the vehicle.

7. The method of claim 1, wherein determining the modification further includes:
determining, by the computing system, a duration of time associated with the modification to the provision of entertainment.

8. The method of claim 1, wherein the output signal for adjusting at least one of the visual or the auditory setting incudes an adjustment that stops the provision of entertainment within the vehicle.

9. The method of claim 1, wherein the output signal for adjusting at least one of the visual or the auditory setting incudes one or more instructions for locking or unlocking an electronic device according to the determined modification.

10. The method of claim 1, wherein analyzing the one or more changes in behavioral performance in order to determine a modification further includes:
analyzing, by the computing system, one or more operational parameters associated with the vehicle in order to determine the degree of modification to the provision of entertainment.

11. A system comprising:
one or more computing devices; and
a non-transitory computer-readable memory coupled to the one or more computing devices and storing thereon instructions, that when executed by the one or more computing devices, cause the one or more computing devices to:
receive information indicative of one or more changes in behavioral performance that coincides with a provision of entertainment within a vehicle, wherein the information indicative of the one or more changes in behavioral performance is based on data captured by one or more sensors of the vehicle;
analyze the one or more changes in behavioral performance in order to determine (i) a severity of the one or more changes in behavioral performance, and (ii) a variable degree of modification to the provision of entertainment within the vehicle, wherein the degree of modification is commensurate with the severity of the one or more changes in behavioral performance; and
based on the determined modification, provide an output signal indicating the determined degree of modification for adjustment of at least one of a visual or an auditory setting correlated to the provision of entertainment within the vehicle.

12. The system of claim 11, wherein the provision of entertainment includes a video signal, wherein the instructions that cause the one or more computing devices to provide the output signal further include instructions to:
provide an image for display subsequent to a pause in the provision of the video signal at least until further detection of a given change in behavioral performance.

13. The system of claim 11, wherein the provision of entertainment includes a video signal, wherein the adjustment of the visual setting includes an increase or decrease in level of brightness associated with the video signal.

14. The system of claim 11, wherein the provision of entertainment includes an audio signal, wherein the adjustment of the auditory setting includes an increase or decrease in level of volume associated with the audio signal.

15. The system of claim 11, wherein the information indicative of the one or more changes in behavioral performance includes image data captured by one or more image sensors, wherein the instructions that cause the one or more computing devices to analyze the one or more changes in behavioral performance further include instructions to:
compare the captured image data to stored image data of predetermined movements; and
based on a match of the captured image data to the stored image data, determine the degree of modification to the provision of entertainment within the vehicle.

16. The system of claim 11, wherein the information indicative of the one or more changes in behavioral performance includes audio data captured by one or more audio sensors, wherein the instructions that cause the one or more computing devices to analyze the one or more changes in behavioral performance further include instructions to:
detect an auditory event indicated by at least one of (i) an increase or decrease in decibel levels associated with one or more occupants in the vehicle, (ii) a frequency of occurrence of the increase or decrease in decibel levels, or (iii) a duration of the increase or decrease in decibel levels; and
based on the detected auditory event, determine the modification to the provision of entertainment within the vehicle.

17. The system of claim 11, wherein the instructions that cause the one or more computing devices to determine the modification further include instructions to:
determine a duration of time associated with the modification to the provision of entertainment.

18. The system of claim 11, wherein the output signal for adjustment of at least one of the visual or the auditory setting incudes an adjustment that stops the provision of entertainment within the vehicle.

19. The system of claim 11, wherein the output signal for adjustment of at least one of the visual or the auditory setting incudes one or more instructions for locking or unlocking an electronic device according to the determined modification.

20. The system of claim 11, wherein the instructions that cause the one or more computing devices to analyze the one or more changes in behavioral performance further include instructions to:
analyze one or more operational parameters associated with the vehicle in order to determine the degree of modification to the provision of entertainment.

* * * * *